United States Patent
Witman et al.

(10) Patent No.: US 8,206,463 B2
(45) Date of Patent: Jun. 26, 2012

(54) COLORED ARTICLE OF MANUFACTURE AND A PROCESS FOR ITS PREPARATION

(75) Inventors: Mark W. Witman, Wexford, PA (US); Robert A. Pyles, Bethel Park, PA (US); Rick L. Archey, Pleasant Hills, PA (US); Joseph D. Ventura, Canonsburg, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1020 days.

(21) Appl. No.: 11/417,720

(22) Filed: May 4, 2006

(65) Prior Publication Data

US 2007/0256255 A1 Nov. 8, 2007

(51) Int. Cl.
- D06P 3/60 (2006.01)
- D06P 5/00 (2006.01)
- D06P 3/52 (2006.01)
- D06P 3/70 (2006.01)
- D06P 3/79 (2006.01)
- D06P 3/24 (2006.01)
- C09B 67/00 (2006.01)

(52) U.S. Cl. ............. 8/402; 8/506; 8/509; 8/510; 8/512; 8/514; 8/515; 8/516; 8/609; 8/611

(58) Field of Classification Search ............... 428/423.1; 351/41; 8/402, 506, 509, 510, 512, 514, 8/515, 516, 609, 611
See application file for complete search history.

(56) References Cited

U.S. PATENT DOCUMENTS

| | | | | |
|---|---|---|---|---|
| 4,310,330 A | | 1/1982 | Funaki et al. ............... 8/506 |
| 4,454,170 A | | 6/1984 | Goepfert et al. ............ 427/160 |
| 5,827,923 A | * | 10/1998 | Medford et al. ............ 524/854 |
| 6,043,334 A | * | 3/2000 | Kanamaru et al. ......... 430/58.35 |
| 6,068,797 A | * | 5/2000 | Hunt ............................. 264/1.7 |
| 6,187,444 B1 | | 2/2001 | Bowles, III et al. ....... 428/423.1 |
| 6,479,561 B1 | | 11/2002 | Zhou et al. ................... 521/155 |
| 6,586,051 B2 | | 7/2003 | Zhou et al. ................. 427/372.2 |
| 6,699,578 B2 | | 3/2004 | Enniss et al. ................. 428/323 |
| 6,727,372 B2 | | 4/2004 | Cyr et al. ...................... 552/238 |
| 6,733,543 B2 | * | 5/2004 | Pyles et al. ...................... 8/506 |
| 6,749,646 B2 | | 6/2004 | Pyles et al. ...................... 8/506 |
| 6,953,618 B2 | | 10/2005 | Enniss et al. ................. 428/212 |
| 2004/0048059 A1 | * | 3/2004 | Enniss et al. ................. 428/329 |
| 2004/0096666 A1 | * | 5/2004 | Knox et al. ................... 428/412 |
| 2004/0145701 A1 | * | 7/2004 | Miniutti et al. ............... 351/159 |
| 2004/0233526 A1 | * | 11/2004 | Kaminsky et al. ............ 359/452 |
| 2006/0230553 A1 | | 10/2006 | Thullen et al. ................... 8/564 |
| 2007/0294841 A1 | | 12/2007 | Thullen et al. ................... 8/516 |

FOREIGN PATENT DOCUMENTS

| | | |
|---|---|---|
| DE | 116 520 | 11/1975 |
| EP | 0 081 346 | 6/1983 |
| EP | 0081346 A1 | 6/1983 |
| EP | 146 136 B1 | 5/1990 |
| EP | 0 587 282 A1 | 3/1994 |
| FR | 2 438 703 | 5/1980 |
| JP | 02270545 | 11/1990 |
| JP | 3-269507 | 12/1991 |
| JP | 2001205172 A | 7/2001 |
| JP | 2005246882 A | 9/2005 |
| WO | 00/14325 | 3/2000 |
| WO | 2005/061597 A2 | 7/2005 |
| WO | 2005/061780 A1 | 7/2005 |
| WO | 2007/025579 A2 | 8/2007 |

OTHER PUBLICATIONS

Database WPI Week 198219 Derwent Publications Ltd., London, GB; AN 1982-37835E XP002462604 & JP 56 140913 A (Toray Ind Inc) Nov. 2, 1981 abstract.

* cited by examiner

Primary Examiner — Ling Choi
Assistant Examiner — Monique Peets
(74) Attorney, Agent, or Firm — John E. Mrozinski, Jr.

(57) ABSTRACT

A process for making a colored article of manufacture is disclosed. Accordingly an article of manufacture is first prepared of a material selected from the group consisting of metal, wood, glass, ceramic, masonry and polymeric materials. A polymeric coating (superstrate) is then applied to at least a portion of the surface of the article. At least a portion of the superstrate is brought into contact with a material system that contains (i) water, (ii) a carrier, (iii) a dye and (iv) a diol, under conditions calculated to bring about diffusion of said dye into said superstrate.

16 Claims, No Drawings

COLORED ARTICLE OF MANUFACTURE AND A PROCESS FOR ITS PREPARATION

FIELD OF THE INVENTION

The invention relates to a process for making an article of manufacture and in particular to a colored article.

BACKGROUND OF THE INVENTION

The art has long recognized compositions that can be applied as protective coatings or finishes (herein coatings) to metal, wood, glass, ceramic, masonry and polymeric materials. Also known are coatings that include pigments or dyes in their compositional makeup. The colorants and coatings must be applied concurrently.

For example, U.S. Pat. Nos. 6,479,561; 6,586,051; 6,727,372; 6,699,578; 5,827,923; 6,727,372 and 6,953,618 disclose mixing dyes in polyurethane or acrylic coatings which are then applied to a substrate. The technology thus disclosed does not enable applying a protective polyurethane or acrylic coating to an article, and color the coating subsequent to the application nor does it permit coloring only restricted/selected areas. Additionally, the disclosed technology does not enable creating a color gradient.

U.S. Pat. No. 6,068,797 disclosed a method of preparing a shaped article having a photochromic coating and a curable photochromic powder coating composition. The method includes applying curable powder coating composition to the interior of a mold, the powder coating compositions including a photochromic material. Following the application, the coating is cured and a polymerizable organic casting composition is then charged into the mold and polymerized. The resulting shaped article having a photochromic coating on its surface is then removed from the mold.

A method of tinting a sheet of transparent polyurethane comprising a coloring operation followed by a fixation operation is disclosed in U.S. Pat. No. 4,454,170. The coloring operation is carried out by immersing the sheet in an agitated bath containing dispersed colorants in an aqueous solution. The fixation operation is carried out through rinsing in a boiling aqueous solution of sodium alkyl sulfonate.

U.S. Pat. No. 6,749,646 disclosed tinting articles molded from a polymeric resin. The process entailing immersing the molded article in a dye bath that contains water, dye, a carrier and an optional surfactant.

U.S. Pat. No. 6,733,543 disclosed dyeing a molded article by immersing at least a portion thereof in a dyeing bath, retaining the portion in the bath for a time sufficient to allow dye to diffuse into the article. The molded article comprises a polymeric resin and the dyeing bath contains in addition to dye, water, a plasticizing agent and a leveling agent.

GDR Patent No. 116 520 disclosed a method of preparing photochromic polymer systems which include photochromic ortho-nitrobenzyl compounds added to reaction systems which lead to polyurethanes. EP146,136 disclosed an optical element with a photochromic coating, such as a polyurethane lacquer in which are incorporated one or more phototropic substances. JP3-269507 disclosed a coating material contains block polyisocyanate, polyol and photochromic material that is applied on a lens and is cured by heating in order to form a primer layer. A hard coat layer consisting of silicone is provided on the polyurethane primer layer.

U.S. Pat. No. 6,187,444 disclosed an article comprising a substrate and a polyurethane coating on at least one surface of the substrate, the coating containing photochromic compound. The photochromic polyurethane coating is prepared from components comprising an organic polyol comprising sections of hard and soft segment-producing polyols; an isocyanate, photochromic compound(s) and optional catalyst.

SUMMARY OF THE INVENTION

A process for making a colored article of manufacture is disclosed. Accordingly an article of manufacture is first prepared of a material selected from the group consisting of metal, wood, glass, ceramic, masonry and polymeric materials. A polymeric coating (superstrate) is then applied to at least a portion of the surface of the article. At least a portion of the superstrate is brought into contact with a material system that contains (i) water, (ii) a carrier (iii) a dye and (iv) a diol, under conditions calculated to bring about diffusion of said dye into said superstrate.

DETAILED DESCRIPTION OF THE INVENTION

In the practice of the inventive process, an article of manufacture is prepared conventionally of a material selected from the group consisting of metal, wood, glass, ceramic, masonry and polymeric materials. To at least a portion of the surface of the article (substrate) there is then fixedly joined a superstrate to produce a coated article. In a subsequent step a coloring dye-containing material system is applied to at least a portion of the coated article under conditions calculated to infuse coloring dye into the superstrate.

The substrate is selected from at least one member of the group consisting of metal, wood, glass, masonry, ceramic and polymeric material, including laminates. In the embodiments where the substrate is a non-metal optionally a thin metal layer, such as aluminum, may be applied, optionally so as to fixedly join—to at least a portion of the substrate, such as by the known metal vapor deposition or electroplating processes, particularly when the superstrate is clear or transparent making the metal layer visible through the superstrate.

The superstrate is selected from at least one member selected from the group consisting of (co)polycarbonate, (co)polyester, acrylonitrile-butadiene-styrene, polyamide, polyurethane, polyalkyl(meth)-acrylate, allyldiglycol carbonate, polymethyl-methacrylate (acrylic), polysiloxane, and styrene and styrene copolymers.

The article to be treated in accordance with the present invention (herein substrate) may be made by any conventional process for shaping the relevant material, be it metal, wood, glass, ceramic, masonry or a polymeric material to obtain a useful article. These processes include laminating, casting, forming, stamping, bending, carving, planing, floating, chiseling, blowing, sintering, compression molding, injection molding, rotational molding, extrusion, stereo lithography and blow molding. The article can also be formed from the lamination of two or more different substrate materials.

The preferred embodiment entails making the article of a thermoplastic molding composition by injection molding, extrusion or thermoforming. Examples of suitable polymeric organic materials to be used in the practice of the invention include polycarbonate resin, such as the co(polycarbonates) derived primarily from bisphenol A and phosgene, e.g.

Makrolon polycarbonate available commercially from Bayer MaterialScience LLC; polyester; below listed polymerizates of a polyol(allyl carbonate) monomer, especially diethylene glycol bis(allyl carbonate), which monomer is sold under the trademark CR-39, and polymerizates of copolymers of a polyol (allyl carbonate) with other copolymerizable monomeric materials, such as copolymers with vinyl acetate, copolymers with a polyurethane having terminal diacrylate functionality, and copolymers with aliphatic urethanes, the terminal portion of which contain allyl or acryl functional groups; poly(vinyl acetate), polyvinylbutyral, polyurethane, polymers of members of the group consisting of diethylene glycol dimethacrylate monomers, diisopropenyl benzene monomers, and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile, polyarylates, polysulfones, polysiloxanes, styrene-acrylonitrile (SAN), acrylonitrile-butadiene-styrene (ABS), polymethylmethacrylate (acrylic) and polyamides and copolymers and blends thereof.

The suitable polymeric material may include one or more functional additives such as mold release agents, flame retardant agents, pigments UV-stabilizers, hydrolytic stabilizers and thermal stabilizers.

In one embodiment, at least part of the surface of the substrate may be first coated such as by vacuum deposition by a thin layer of metal (e.g. aluminum) the layer preferably measuring 20-25 angstroms in thickness. After the application of a clear superstrate and coloring in accordance with the inventive process the substrate will feature an attractive metallic effect.

In a subsequent step of the process, to at least part of the surface of the substrate there is fixedly joined a polymeric superstrate. The superstrate may be fastened to the substrate by any conventional means that result in the substrate and superstrate forming a permanent union, including chemical or physical bonding or adhesion attained by adhesive, fastening or such as is produced by, in the case of a substrate made of an extrudable material, coextrusion. The superstrate is preferably a weatherable and more preferably selected from the group consisting of polyurethane and acrylic coatings.

Polyurethane coatings are described in Ullmann's Encyclopedia of Industrial Chemistry, Fifth Edition, 1992, Vol. A21, pages 665 to 716, incorporated herein by reference.

Acrylic coatings, their preparation and method of application are known (see for instance U.S. Pat. Nos. 6,900,252; 6,407,181; 6,383,652; 6,274,671; 6,120,901; 5,981; 076; 5,773,077; 5,747,392; 4,724,186; 4,555,535; 4,503,175; 4,472,484; 4,131,571 all incorporated by reference herein). The thickness of the superstrate is calculated to enable diffusion of sufficient dye to produce the desired color intensity.

The surface of the substrate may be cleaned conventionally prior to application of the coating to enable proper adhesion of the coating. Cleaning methods include ultrasonic cleaning; washing with an aqueous mixture of organic solvent, UV treatment, activated gas treatment, and chemical treatment such as hydroxylation. U.S. Pat. Nos. 3,971,872; 4,904,525; and 5,104,692 that are incorporated by reference herein disclose suitable surface treatments.

In a subsequent step of the inventive process the substrate carrying the fixedly joined superstrate is brought into contact with an aqueous material system that contains a dye, under condition calculated to bring about diffusion of the dye into the superstrate.

The Material System Contains
(a) water
(b) an amount of dye sufficient to impart the desired color, generally 0.001 to 15, preferably 0.01 to 0.5 pbw (percent by weight relative to the weight of the material system)
(c) a carrier conforming to formula (i) in an amount of 15-30% pbw $$R^1[-O-(CH_2)_n]_mOR^2 \quad (i)$$

wherein $R^1$ and $R^2$ independently one of the other denote H or $C_{1-18}$ alkyl, benzyl, benzoyl or phenyl radical which may be substituted in the aromatic ring by alkyl and or halogen, n is 2, 3 or 4, preferably 2 and m denoted 1 to 35 preferably 1 to 12, most preferably 1. In a preferred embodiment $R^1$ denotes butyl and $R^2$ denotes H, and (d) at least one diol in an amount of 0-15% pbw.

The carrier is typically present in the material system in a positive amount up to and including 30 percent by weight, preferably 1 to 25 percent by weight, and more preferably 5 to 20 percent by weight, relative to the weight of the material system.

Suitable dyes are static dyes, that is dyes that do not substantially change color upon exposure to (or being shielded from) ultraviolet (UV) light, and include for example, fabric dyes and disperse dyes as well as dyes that are known in the art as being suitable for tinting plastic articles, such as thermoplastic polycarbonate articles. Examples of suitable disperse dyes include, but are not limited to, Disperse Blue #3, Disperse Blue #14, Disperse Yellow #3, Disperse Red #13 and Disperse Red #17. The classification and designation of the static dyes are in accordance with "The Colour Index", $3^{rd}$ edition published jointly by the Society of Dyes and Colors and the American Association of Textile Chemists and Colorists (1971), which is incorporated herein by reference. Dyestuffs may be used either singly or as a component in a dye mixture. The static dye class known as Direct Dyes is useful in the practice of the present invention. Direct Dye examples include Solvent Blue 35, Solvent Green 3 and Acridine Orange Base. However, it has been observed that Direct Dyes, typically do not color (tint/dye) the plastic article as intensely as do Disperse Dyes.

Further suitable static dyes include water-insoluble azo, diphenylamine and anthraquinone compounds. Especially suitable are acetate dyes, dispersed acetate dyes, dispersion dyes and dispersol dyes, such as are disclosed in Colour Index, $3^{rd}$ edition, vol. 2, The Society of Dyers and Colourists, 1971, pp. 2479 and pp. 2187-2743, respectively all incorporated herein by reference. Preferred dispersed dyes include Dystar's Palanil Blue E-R150 (anthraquinone/Disperse Blue) and DIANIX Orange E-3RN (azo dye/CI Disperse Orange 25). It has been observed that phenol red and 4-phenylazophenol do not provide a desirable level of dying when the plastic article is thermoplastic polycarbonate, in the present process.

Static dyes known as direct dyes and those referred to as acid dyes have been observed to provide a less than desirable level of tinting when the plastic article is thermoplastic polycarbonate, in the practice of the present invention. However, acid dyes have been observed to be effective with nylon.

Another class of suitable static dyes that may be used in the method of the present invention includes non-migratory static dyes (i.e., static dyes that have been chemically modified to minimize or prevent their migration out of plastic articles into which they have been incorporated). Suitable non-migratory static dyes have been disclosed in U.S. Pat. Nos. 4,284,729; 4,640,690; and 4,812,141, all incorporated herein by reference. Non-migratory static dyes have been found to be useful when dyeing plastic articles by the inventive process.

The amount of dye present in the dye bath may vary widely and depends on the solubility of the dye within the mixture of water, carrier and diol. The solubility of the dye within the bath will also be affected by the temperature of the bath.

Typically the dye is present in the dye bath in an amount sufficient to result in the formation of a dyed plastic article.

The diol is present in the material system in a positive amount of up to 15 pbw, preferably 7-12% pbw, most preferably 10 to 12% pbw.

Included among the suitable diols are linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols.

Water is present in the aqueous material system in an amount of less than 85 pbw preferably less than or equal to 75 percent by weight. Water is typically present in an amount of from 65 to 75 percent by weight. The water used is preferably deionized and/or distilled water.

The material system may further include an optional emulsifier. An emulsifier is a substance that holds two or more immiscible liquids or solids in suspension (e.g., water and the dye). Suitable emulsifiers include ionic, non-ionic, or mixtures thereof. Typical ionic emulsifiers are anionic, including amine salts or alkali salts of carboxylic, sulfamic or phosphoric acids, for example sodium lauryl sulfate, ammonium lauryl sulfate, lignosulfonic acid salts, ethylene diamine tetra acetic acid (EDTA) sodium salts and acid salts of amines such as laurylamine hydrochloride or poly(oxy-1,2-ethanediyl), alpha.-sulfo-omega-hydroxy ether with phenol 1-(methylphenyl)ethyl derivative ammonium salts; or amphoteric, that is, compounds bearing both anionic and cationic groups, for example lauryl sulfobetaine; dihydroxy ethylalkyl betaine; amido betaine based on coconut acids; disodium N-lauryl amino propionate; or the sodium salts of dicarboxylic acid coconut derivatives. Typical non-ionic emulsifiers include ethoxylated or propoxylated alkyl or aryl phenolic compounds such as octylphenoxypolyethyleneoxyethanol or poly(oxy-1,2-ethanediyl),alpha-phenyl-omega-hydroxy, styrenated. The preferred emulsifier is a mixture of $C_{14}$-$C_{18}$ and $C_{16}$-$C_{18}$ ethoxylated unsaturated fatty acids and poly(oxy-1,2-ethanediyl), alpha-sulfo-omega-hydroxy ether with phenol 1-(methyl-phenyl) ethyl derivative ammonium salts and poly(oxy-1,2-ethane-diyl),alpha-phenyl-omega-hydroxy, styrenated.

Emulsifiers, such as disclosed in "Lens Prep II", a commercial product of Brain Power International (BPI) are also useful for practicing the present invention. LEVEGAL DLP a product of Bayer MaterialScience is a pre-formulated mixture of a carrier (polyglycol ether) with emulsifiers suitable in the present context.

Bringing the superstrate into contact with the aqueous material system may be by any means including dipping that is immersing it in a bath containing the material system, by spraying the material system onto the coated article or by subjecting the coated article to flow coating. Bringing the coated article into contact with the aqueous material system is carried out under conditions calculated to bring about a degree of diffusion of the dye into the substrate. Adjusting of the temperature of the aqueous material system and/or that of the superstrate, the time of contact and the orientation of the superstrate in relation to the material system are included among the considered conditions and are determined by the skilled artisan in accordance with, among others, the geometry of the article and the desired degree of color intensity.

Applying material system to the surface of the coated article by "flow coating" refers to causing the material system to flow over a designated surface of the article, the flowing due primarily to gravity, to form a thin, at least temporary layer of liquid. The spraying of the material system entails to the use of force, additional to gravity in propelling the material system onto the surface of the coated article. "Flow coating" may be applied such as by pouring. The means for pouring a solution onto the surface of an article are known and require no elaboration.

The article may be any of a variety of useful items; decorative coated aluminum wheels and PRNDLs (the decorative surrounding of gear shifters) for vehicles, coated decorative aluminum and polymeric materials used for cell phone covers, colored wooden flooring, colored glass surfaces and laminates for furniture, windows and cabinetry, colored masonry floors, walls and walkways and metallic finishes for signs, displays, golf balls and trophies.

Upon removal from contact with the material system, the inventive article is typically rinsed to remove excess material system therefrom.

The present invention is more particularly described in the following examples, which are intended to be illustrative only, since numerous modifications and variations therein will be apparent to those skilled in the art. Unless otherwise specified, all parts and percentages are by weight.

EXAMPLES

Inventive articles have been prepared as described below:

Example 1

To a thermoplastically molded substrate of polycarbonate (Makrolon homopolycarbonate of bisphenol A, a product of Bayer MaterialScience, having MFR of 6 g/10 min, in accordance with ASTM D1238) measuring 0.25 by 5 by 7.6 cm. there was applied a weatherable polyurethane coating (superstrate). In preparing the coating the Components I and II were first prepared and mixed under agitation:

Component I Contained
- (a) 282.39 parts by weight (pbw) of a polyester polyol prepared from 34.6 parts 1,6-hexane diol, 9.8 parts trimethylol propane, 30.43 parts isophthalic acid, 5.4 parts phthalic acid anhydride and 10.7 parts adipic acid, and having an OH equivalent weight of 400, an OH content of 4.25% and a functionality of about 3.1, and
- (b) 385.26 pbw of a solvent mixture (6.78 pbw xylene, and 126.16 pbw of each of methylisobutyl ketone, n-butyl acetate and methyl n-amyl ketone) and
- (c) 1.69 pbw of a catalyst. Component I additionally contained a flow aid and light stabilizers believed to have no criticality in the context of the invention.

Component II contained 113.03 pbw of an isocyanurate group-containing polyisocyanate prepared from 1,6-hexamethylene diisocyanate and having an isocyanate content of 21.6%, a content of monomeric diisocyanate of <0.3% and a viscosity at 25° C. of 3000 mPa·s.

Components I and II were mixed under agitation and stored in a sealed container.

The mixture was then applied to the test specimens by spraying and cured at room temperature (about 72° F.).

The thus coated specimens now carrying a cured superstrate were then immersed in a mixing tank containing a material system. The material systems contained 18,976 grams of deionized water, 4929 grams of ethyleneglycol mono-butyl ether (as carrier), and 3081 grams of diethylene glycol (as diol). This mixture was heated to 85° C., and then forwarded continuously through a 20 micron bag filter into which 50.0 g of dye had been previously placed. The heated mixture, containing the dye, was cycled from the mixing tank through the bag filter and back to the mixing tank for a period of time sufficient to saturate the mixture of water, carrier and diol with the dye, and thus form the material system. The material system was recycled back to the mixing tank through small openings (having diameters of 4.8 mm) to enhance mixing of the material system. The initial cycling, for purposes of forming a saturated material system, was performed for a period of approximately 15 minutes (excluding heat-up time). The material system was then continuously cycled through the above described system at a temperature of 85° C., and at a rate of 72 liters/minute. The amount of dye in the material system is about 0.2 percent by weight, based on the weight of the system. The thus treated specimens were observed to exhibit an attractive color

Example 2

The same procedures as Example 1 were followed except that wood (oak) flooring was used as the substrate.

Example 3

The same procedures as Example 1 were followed except that tempered glass was used as the substrate.

Example 4

The same procedures as Example 1 were followed except that aluminum coupons were used as the substrate.

Example 5

The same procedures as Example 1 were followed except that stainless steel coupons were used as the substrate.

Example 6

The same procedures as Example 1 were followed except a cinder block was used as the substrate.

Example 7

The same procedures as Example 1 were followed except that the polycarbonate substrate was first coated (by vacuum deposition) with aluminum (20-24 angstrom thick). The polyurethane superstrate was applied directly onto the metallized surface.

Example 8

The same procedures as Example 1 were followed except the polycarbonate substrate was first coated (by vacuum deposition) with aluminum (20-24 angstrom thick) on one side of the poly-carbonate plaque. The aluminum layer was then covered with an opaque epoxy coating. The uncoated and un-metallized side of the polycarbonate plaque was coated with the superstrate.

Example 9

The same procedures as Example 8 were followed except the uncoated and un-metallized side of the polycarbonate plaque was not coated with the superstrate but instead was contacted directly by material system.

Example 10

The same procedures as Example 1 were followed except the substrate was aluminum and the superstrate was an acrylic coating.

The exemplified articles thus prepared exhibited attractive coloring.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a colored article of manufacture comprising:
    (i) preparing a substrate from at least one material selected from the group consisting of metal, wood, glass, ceramic; masonry and polymeric materials;
    (ii) fixedly joining a superstrate to at least a portion of the surface of said substrate; and
    (iii) applying a dye-containing material system by one of immersion, spraying and flow coating, to at least a portion of said superstrate under conditions calculated to diffuse dye to said portion of said superstrate, said superstrate including at least one member selected from the group consisting of (co)polycarbonate, (co)polyester, ABS, (co)polyamide, polyurethane, polyalkyl(meth) acrylate, (co)polysiloxane and (co)polystyrene, said material system containing,
    (a) water,
    (b) at least one carrier nonconforming to formula I,

wherein $R^1$ is a radical selected from the group consisting of linear or branched $C_1$-$C_{18}$ alkyl, benzyl, benzoyl and phenyl, $R^2$ is $R^1$ or H, n is 2, 3 or 4, and m is 1 to 35;
    (c) a dye, and
    (d) a diol.

2. The process of claim 1 wherein at least a portion of said substrate is coated with a thin layer of metal prior to said (ii).

3. The process of claim 2 wherein said substrate is coated with a thin layer of aluminum.

4. The process of claim 3 wherein said aluminum is applied by vapor deposition or by electroplating.

5. The process of claim 1 wherein the substrate is in the form of a sheet.

6. The process of claim 5 wherein the sheet is glass.

7. The process of claim 5 wherein the sheet is metal.

8. The process of claim 5 wherein the sheet, is polymeric.

9. The process of claim 1 wherein the joining is by coextrusion.

10. The process of claim 1 wherein the joining is by powder coating.

11. The process of claim 1 wherein the joining is by adhesive bonding.

12. The process of claim 1 wherein the diol is at least one member selected from the group consisting of linear and branched $C_2$-$C_{20}$ aliphatic diols, $C_5$-$C_8$-cycloaliphatic diols, and aromatic diols.

13. The process of claim 1 wherein the polyurethane is a product of the catalyzed reaction of at least one organic polyol selected from a first group consisting of low molecular weight polyols, polyester polyols, polyether polyols, amide-containing polyols, polyacrylic polyols, epoxy polyols, polyhydric polyvinyl alcohols, urethane polyols with at least' one member selected from a second group consisting of aliphatic isocyanates, aromatic isocyanates, cycloaliphatic isocyanates and heterocyclic isocyanates.

14. The process of claim 13 wherein said second group consists of hexamethylene-1,6-diisocyanate, isophorone diisocyanate, ethylene diisocyanate, dodecane-1,12-diisocyanate and cyclohexane-1,3-diisocyanate.

15. The process of claim 1 wherein the superstrate is poly-alkyl(meth)acrylate.

16. The article prepared by the process of claim 1.

* * * * *